(12) United States Patent
Frisken et al.

(10) Patent No.: US 6,415,077 B1
(45) Date of Patent: Jul. 2, 2002

(54) REFLECTIVE NON-RECIPROCAL OPTICAL DEVICE

(75) Inventors: Steven James Frisken, Randwick; John William Arkwright, Coogee; Peter Collin Hill, Glenbrook, all of (AU)

(73) Assignee: Nortel Networks (Photonics) Pty. Ltd., Eveleigh (AU)

( * ) Notice: Subject to any disclaimer, the term of this patent is extended or adjusted under 35 U.S.C. 154(b) by 0 days.

(21) Appl. No.: 09/610,601

(22) Filed: Jul. 5, 2000

Related U.S. Application Data

(63) Continuation-in-part of application No. 09/345,027, filed on Jul. 2, 1999.

(51) Int. Cl.[7] .................................................. G02B 6/26
(52) U.S. Cl. ............................. 385/31; 385/11; 385/27; 385/28; 385/33; 385/43; 385/44; 385/47
(58) Field of Search ............................... 385/11, 14, 15, 385/16, 33, 34, 31, 27, 28, 47, 24, 43

(56) References Cited

U.S. PATENT DOCUMENTS

| 5,191,467 A | * | 3/1993 | Kapany et al. ............. 359/341 |
| 5,321,774 A | * | 6/1994 | Barnard et al. ................ 385/16 |
| 5,471,340 A | | 11/1995 | Cheng et al. ................ 359/281 |
| 5,768,005 A | * | 6/1998 | Cheng et al. ............. 385/11 X |
| 5,848,203 A | | 12/1998 | Kawakami et al. ........... 385/11 |
| 5,930,422 A | * | 7/1999 | Cheng .......................... 385/47 |
| 6,014,475 A | | 1/2000 | Frisken ........................ 385/11 |
| 6,075,596 A | | 6/2000 | Pan et al. .................... 356/345 |
| 6,111,695 A | * | 8/2000 | Lee et al. .................... 359/484 |
| 6,118,910 A | | 9/2000 | Chang .......................... 385/16 |
| 6,178,044 B1 | | 1/2001 | Li et al. ...................... 359/484 |
| 6,263,131 B1 | * | 7/2001 | Frisken et al. ................ 385/31 |

* cited by examiner

Primary Examiner—Brian Healy
(74) Attorney, Agent, or Firm—Ladas & Parry

(57) ABSTRACT

A non-reciprocal optical device mapping a series of optical input/output signal waveguides to a corresponding series of optical input/output signal waveguides, the device comprising: a series of spaced apart input/output waveguides; a reflective imaging system for reflecting and focussing light emitted from the input/output waveguides; a plurality of crystal elements between the input/output waveguides and the reflective imaging means; at least one non-reciprocal polarization rotation element; wherein light emitted from a first input/output waveguide is transmitted to a second input/output waveguide in a polarization independent manner and light emitted from the second input/output waveguide is transmitted away from the first input/output waveguide.

7 Claims, 16 Drawing Sheets

REFLECTIVE NON-RECIPROCAL OPTICAL DEVICE

This application is a continuation-in-part application Ser. No. 09/345,027 filed on Jul. 2, 1999.

FIELD OF THE INVENTION

The present invention relates to the field of non-reciprocal optical devices such as optical circulators or the like.

BACKGROUND OF THE INVENTION

Optical circulator devices are well known in the art and normally comprise a series of bi-directional ports and a "non-reciprocal" mapping between ports. For example, in a three-port optical circulator device, the ports may be designated A, B and C and the non-reciprocal nature of the device is such that an input signal at Port A will be output at Port B, an input signal at Port B will be output at Port C and an input signal at Port C will be output at Port A.

It is desirable with any circulator type device to manufacture as compact and inexpensive a device as possible.

SUMMARY OF THE INVENTION

The object of the present invention is to provide for a compact form of optical circulator device having a high level of compactness and flexibility.

In accordance with a first aspect of the present invention, there is provided a non-reciprocal optical device mapping a series of optical input/output signal waveguides to a corresponding series of optical input/output signal waveguides, the device comprising: a series of spaced apart input/output waveguides; a reflective imaging system for reflecting and focussing light emitted from the input/output waveguides; a plurality of crystal elements between the input/output waveguides and the reflective imaging means; at least one non-reciprocal polarization rotation element; wherein light emitted from a first input/output waveguide is transmitted to a second input/output waveguide in a polarization independent manner and light emitted from the second input/output waveguide is transmitted away from the first input/output waveguide.

Light emitted from the second input/output waveguide can be transmitted to a third input/output waveguide and light emitted from the third input/output waveguide can be transmitted to the first input/output waveguide so as to provide for a fully circulating circulator.

The input/output signal waveguides can comprise optical fibres and mode expansion can be provided by utilizing thermally expanded core fibre ends, gradient index fibres, or a separate lensing system, or a combination of thereof.

In accordance with a further aspect of the present invention, there is provided a non-reciprocal optical device mapping a series of optical input/output signal waveguides to a series of optical input/output waveguides, the device comprising: a series of spaced apart input/output signal waveguides; a first polarization separation means for spatially separating the optical input signals emitted from the optical input/output signal waveguides into orthogonal polarization components; a first series of reciprocal polarization transformation elements for aligning the polarizations thereby producing aligned polarization components; a non-reciprocal rotator for applying a non-reciprocal rotation to the aligned polarization components; a second polarization separation means for spatially displacing aligned polarization components; at least one reciprocal polarization transformation element for rotating the aligned polarization components emitted from a subset of the input/output signal waveguides; imaging means for imaging the aligned polarization components to produce imaged polarization components; and reflection means for reflecting the polarization components wherein light emitted from a first input/output waveguide is transmitted to a second input/output waveguide in a polarization independent manner and light emitted from the second input/output waveguide is transmitted away from the first input/output waveguide.

Again, light emitted from the second input/output waveguide can be transmitted to a third input/output waveguide and light emitted from the third input/output waveguide can be transmitted to the first input/output waveguide so as to provide for a fully circulating circulator.

In accordance with a further aspect of the present invention, there is provided a non-reciprocal optical device comprising: at least two spaced apart rows each containing a series of input/output waveguides; a first polarization dependant displacement means spatially displacing orthogonal polarizations of light emitted from the waveguides; a first series of reciprocal polarization transformation elements aligning the orthogonal polarizations emitted from the first polarization displacement means; a non reciprocal-rotator rotating the aligned polarization states in a non reciprocal manner; a second polarization dependant displacement means displacing light emitted from the reciprocal polarization transformation element in a polarization dependant manner; focusing means for focusing light emitted from the waveguides substantially on the waveguides; reflection means reflecting light emitted from a first of the rows back in the direction of a second of the rows; wherein light emitted from a first one of the waveguides in a first row is transmitted to a first one of the waveguides in a second row in a non reciprocal manner.

The light emitted from the first one of the waveguides in the second row is preferably transmitted to a second one of the waveguides in the first row.

In one embodiment, the number of waveguides in each row can be four and light emitted from any one of the waveguides in a first row can be transmitted to a predetermined waveguide in the second row. The first polarization means preferably translates one orthogonal polarization state substantially perpendicular to the rows.

The first series of reciprocal polarization transformation elements can comprise a series of abutted reciprocal rotators which rotate the displaced orthogonal polarizations in an opposite direction. The focusing means can be adjacent the reflection means. The second polarization displacement means can displace one of the polarizations parallel to the rows.

In accordance with a further aspect of the present invention, there is provided a method of mapping a first series of optical input/output signal waveguides to a second series of optical input/output waveguides in a non-reciprocal manner, the method comprising the steps of: (a) emitting an optical signal from one of the waveguides; (b) spatially separating substantially orthogonal polarisation states of the emitted light using a first optical element; (c) aligning the substantially orthogonal polarization states using a second optical element; (d) projecting the aligned orthogonal polarization states through a first series of optical elements; and (e) reflecting the light emitted from the step (d) back through the first series of optical elements, the second optical element and the first optical element; wherein light emitted from the first one of the waveguides is transmitted to a second one of the waveguides and light emitted from a second one of the waveguides is transmitted to a third one of the waveguides.

The light is ideally transmitted from one waveguide to a second in a polarization independant manner and light emitted from the third one of the waveguides can be transmitted to the first waveguide.

Many different uses of the circulator are possible. For example, an add/drop multiplexer or other optical transmission system.

BRIEF DESCRIPTION OF THE DRAWINGS

Notwithstanding other forms which may fall within the scope of the present invention, preferred forms of the invention will now be described, by way of example only, with reference to the accompanying drawings in which.

DETAILED DESCRIPTION OF THE EMBODIMENTS

In the first embodiment, an optical circulator type device is provided which utilises a series of optical components followed by a mirror which reflects input signals back to a series of outputs so as to provide for a fully circulating three-port circulator.

Figure 1:
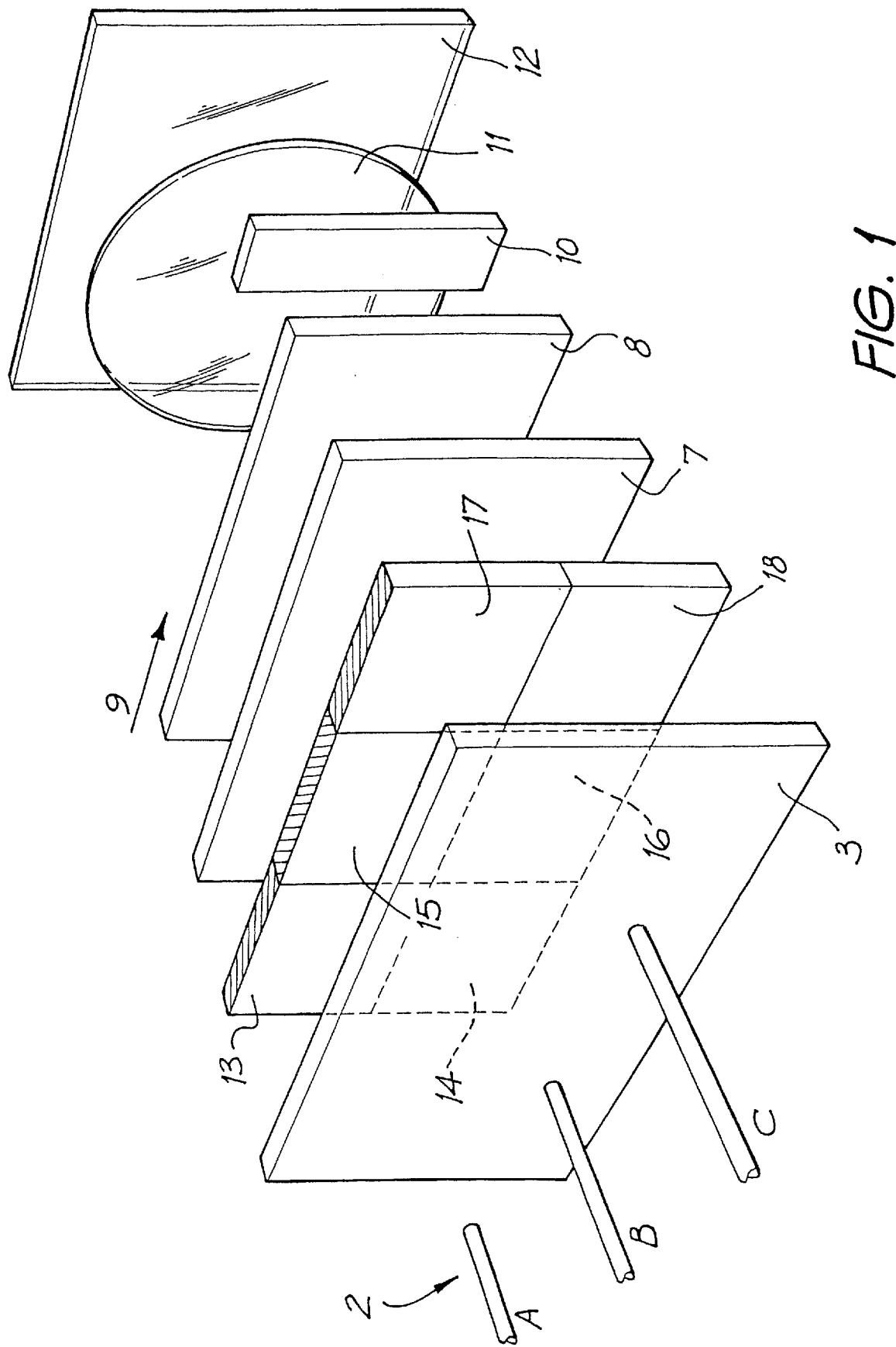
FIG. 1 illustrates schematically in perspective the arrangement of the first embodiment.

Turning initially to FIG. 1, there is illustrated schematically the arrangement 1 of the first embodiment. The first embodiment includes an initial horizontal array 2 of three single mode fibres (SMF) labelled A, B and C which are approximately 125 microns in diameter and can include a short length of gradient index fiber attached to an end or other forms of mode expansion as discussed hereinafter. The three fibres 2 can be arranged in corresponding V-grooves with approximately 127 microns spacing. The gradient indexed fibre is such that it projects an enlarged image of the SMF fibre mode at distances of approximately 500 microns in air and with a diameter of 30 microns. Such devices are commercially available from Highwave Optical Technologies.

The device proper consists of the following components:

1. A first walkoff crystal 3 is provided and can comprise a rutile crystal with a width of approximately 1 mm. The walkoff crystal 3 is positioned adjacent to the gradient indexed fibre and is of sufficient dimension to separate the polarisation states projected from the fibres.

2. Next, a series of reciprocal rotators 13, 14, 15, 16, 17, 18 are provided to achieve polarisation state equalisation of the fibres. The middle rotators 15, 16 are aligned in an orthogonal manner to the other rotators.

3. Next, a Faraday rotator 7 is provided to rotate all polarisation states by 45°.

4. Next, a rutile plate 8 is provided to allow 127 microns displacement in the direction 9.

5. Next, a half-wave plate 10 is provided to intercept only the light from the fibre C on the outgoing path.

6. Next, a lens 11 can be a gradient indexed lens of pitch such as approximate formation of the fibre images is achieved.

7. Finally, a reflective mirror surface 12 is positioned at a distance behind the lens 11 such that parallel rays are returned substantially parallel.

The arrangement of FIG. 1 is useful in providing for a fully circulating circulator in that input light from the fibre port A is output at fibre port B, input light from the fibre port B is output at fibre port C and input from fibre port C is output at the fibre port A.

Figure 2:
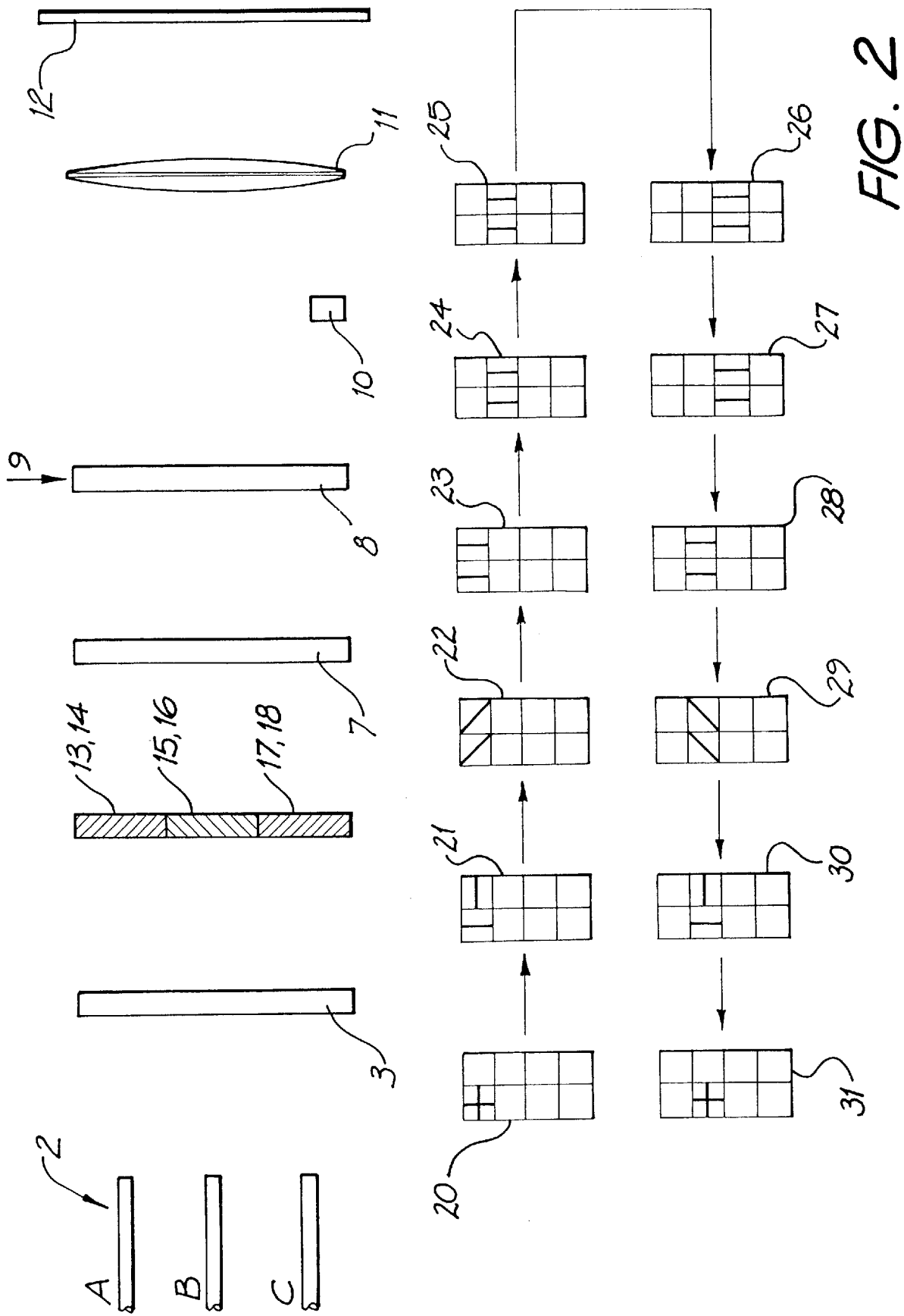
FIG. 2 illustrates a first polarization transition state diagram of light travelling from fibre A to fibre B.

Turning now to FIG. 2, there is illustrated an initial polarization transition diagram for light travelling from port A to port B. The two orthogonal polarizations states are initially spatially coincidental and are indicated by the initial cross 20. Subsequently, after traversing walkoff plate 3, the polarizations states are separated 21. The reciprocal rotators 13, 14 result in a reciprocal rotation of each of the polarisation states so as to cause the output polarization state 22 to be at 45°.

The non-reciprocal rotator 7 provides for a non-reciprocal rotation of the polarisation states which-results in the aligned polarization state 23. The rutile 8 results in a translation 24 of the two polarisation states. The halfwave plate 10 is positioned so it will have no effect on the polarisation states in this case. The effect of the lensing system 11 and mirror 12 is illustrated by the polarisation state diagram 26 and results in an inversion of the spatial states upon reflection from the mirror. The halfwave plate 10 is positioned not to have an effect on the polarisation state 26 and therefore results in polarisation state 27. The walkoff plate 8 translates the polarisation states 28. The Faraday rotator 7 is a non-reciprocal device and results in a non-reciprocal rotation of the polarisation states resulting in aligned polarisation states 29. The reciprocal rotators 15, 16 are positioned to rotate the polarisation states by 45° in a reciprocal manner resulting in the polarisation state 30. The walkoff plate 3 then combines the polarisation states so as to produce output 31 having spatially combined polarisation states. Hence, the overall result is the transmission of output of fibre A to the fibre port B.

Figure 3:
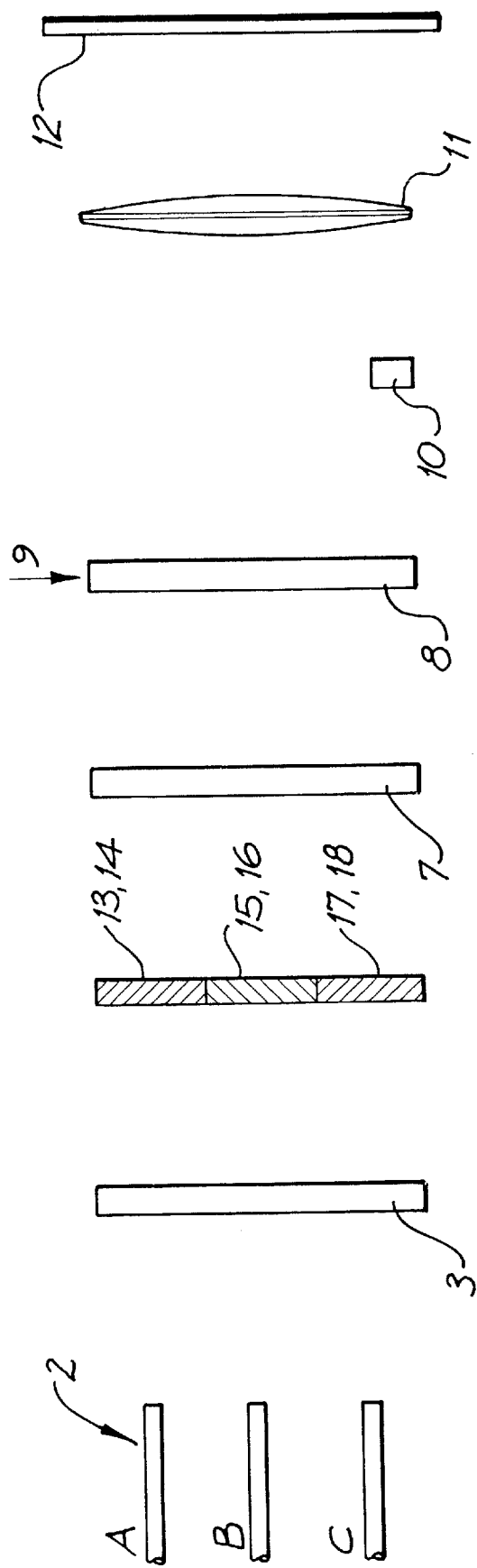
FIG. 3 illustrates a second polarization transition state diagram of light travelling from fibre B to fibre C.
Figure 3:
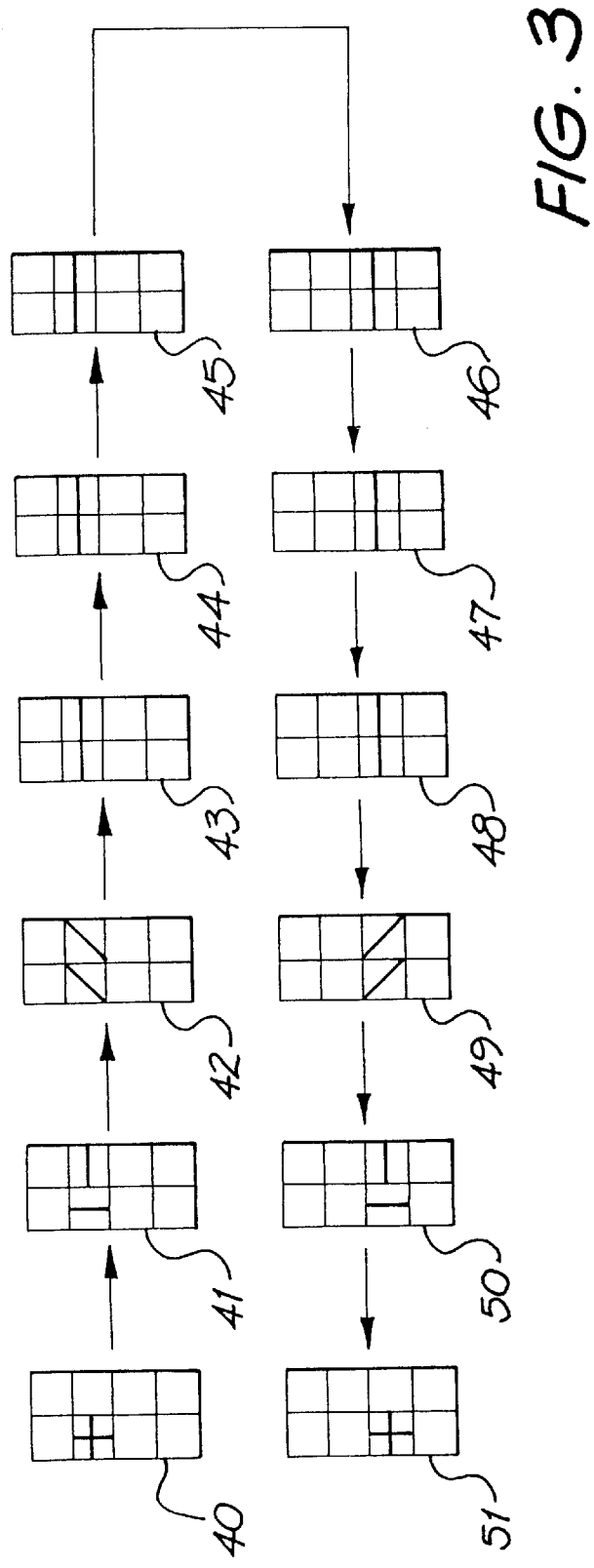

Turning now to FIG. 3, there is illustrated the polarisation state transition diagram for light emitted from the fibre port B to the fibre port C. In the initial polarisation state 40, both orthogonal polarisation states are spatially coincident. The walkoff plates 3 results in a translation of one polarisation state with respect to the other 41. The reciprocal rotators 15, 16 results in the alignment of the two polarisation states 42. The rutile 8 has no effect 44, nor does the halfwave plate 10 which results in the polarisation state 45. The lens and mirror 11, 12 again result in an inversion of the polarisation states so as to produce the state 46. The halfwave plate 10 has no effect 47. The rutile 8 again has no effect producing polarisation state 48. The non-reciprocal Faraday rotator 7 rotates the polarisation states 49 as does the reciprocal rotator 17,18 which produces the polarisation state 50. The walkoff plate 3 combines the polarisation states so as to produce output 51 having spatially combined polarisation states.

Figure 4:
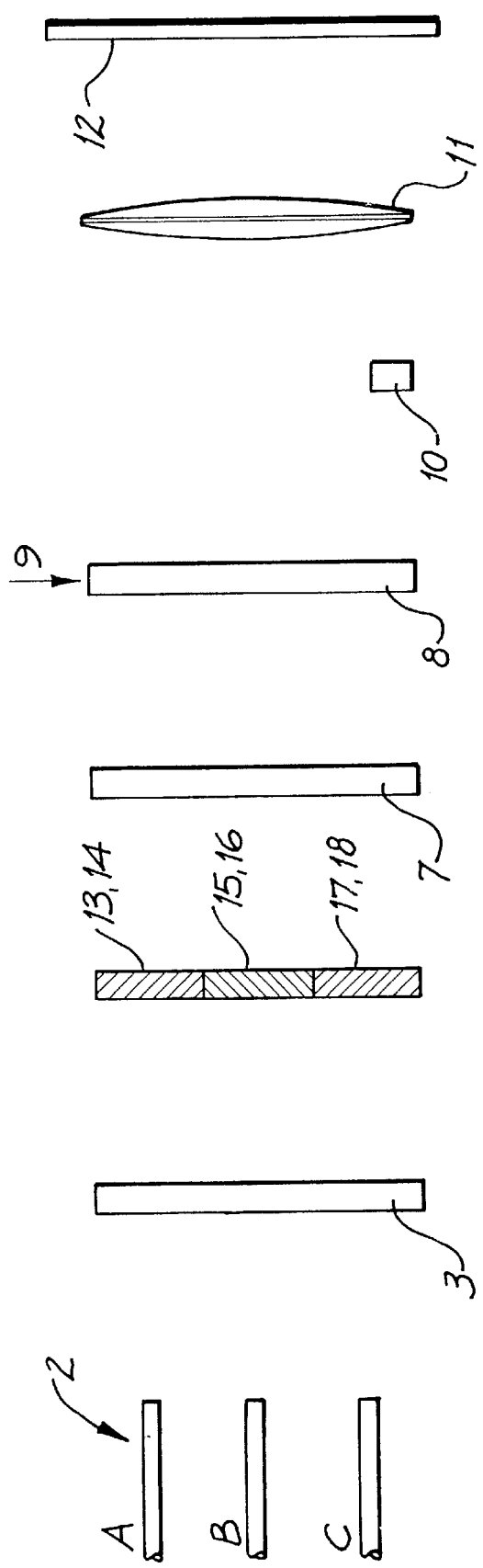
FIG. 4 illustrates a third polarization transition state diagram of light travelling from fibre C to fibre A.
Figure 4:
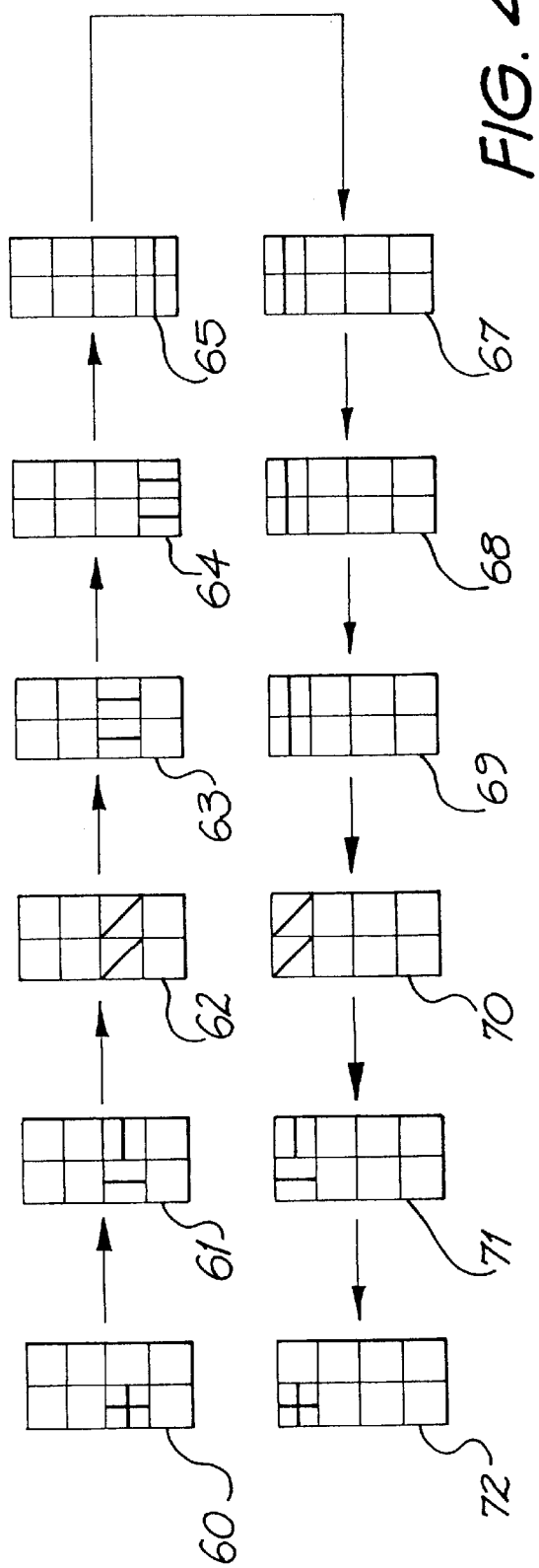

Turning now to FIG. 4, there is illustrated the polarisation state transition diagram for a fibre port C to fibre port A. Starting initially with the polarisation state 60, the walkoff plate 3 results in a splitting of the polarisation states 61. Subsequently, the reciprocal rotators 17,18 results in a reciprocal rotation of the polarisation states to bring them into alignment. The Faraday rotator 7 in turn rotates the polarisation state to produce polarisation of state 63. The walkoff plate 8 translates the polarisation state producing the resultant polarisation state 64. The halfwave plate 10 in turn results in a rotation of the polarisation state producing polarisation state 65. Subsequently, after passing through lens 11 and being reflected by mirror 12, the polarisation state 67 is produced. The halfwave plate 10 has no effect 68 nor does the walkoff plate 8 which results in the polarisation of state 69. The Faraday rotator 7 rotates the polarisation states 70 and the reciprocal rotator further rotates the polarisation states to produce the polarisation state 71 which is combined by walkoff plate 3 to produce output 72 which is output to fibre A.

It can therefore be seen from the polarisation transition diagrams of FIG. 2 to FIG. 4 that the first embodiment operates as a fully circulating circulator.

Figure 5:
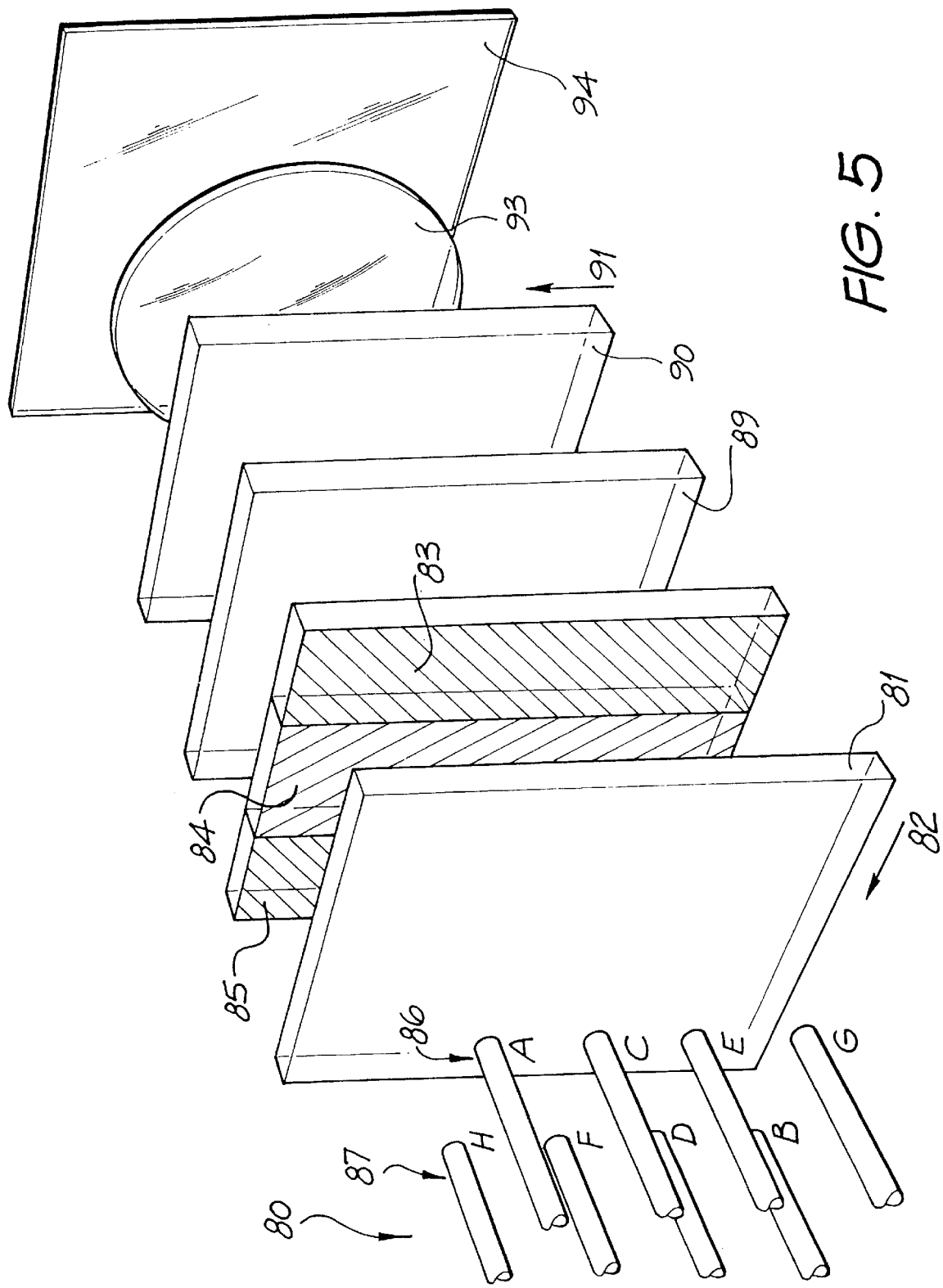
FIG. 5 illustrates schematically in perspective the arrangement of an alternative embodiment.

Turning now initially to FIG. 5, there is illustrated an alternative embodiment modified so as to provide for multiple input/output ports. In the embodiment of FIG. 5, eight fibres form input/output port 80 as shown, divided into two rows 86, 87 each indicated with a corresponding letter A to H. The port 80 can be arranged in two rows and include expanded core fibre ends, or alternatively, gradient index fibre ends of about 125 micron diameter and arranged to the V groove of approximately 127 micron spacing and 200 micron spacing between the two rows of fibres 86, 87.

A first rutile crystal 81 is provided with the width of approximately 1 mm to separate the polarisation states projected from the fibres 80. The walkoff is preferably in the direction 82.

A series of reciprocal rotators or halfwave plates 83–85 are positioned to achieve polarisation state equalisation of the light proceeding from the two spaced apart rows 86, 87. The rotator 84 has a 45 degree rotation in the opposite direction of rotation relative to the rotators 83, 85.

A non-reciprocal Faraday rotator 89 provides non reciprocal 45° rotation of all polarisation states.

Figure 6:
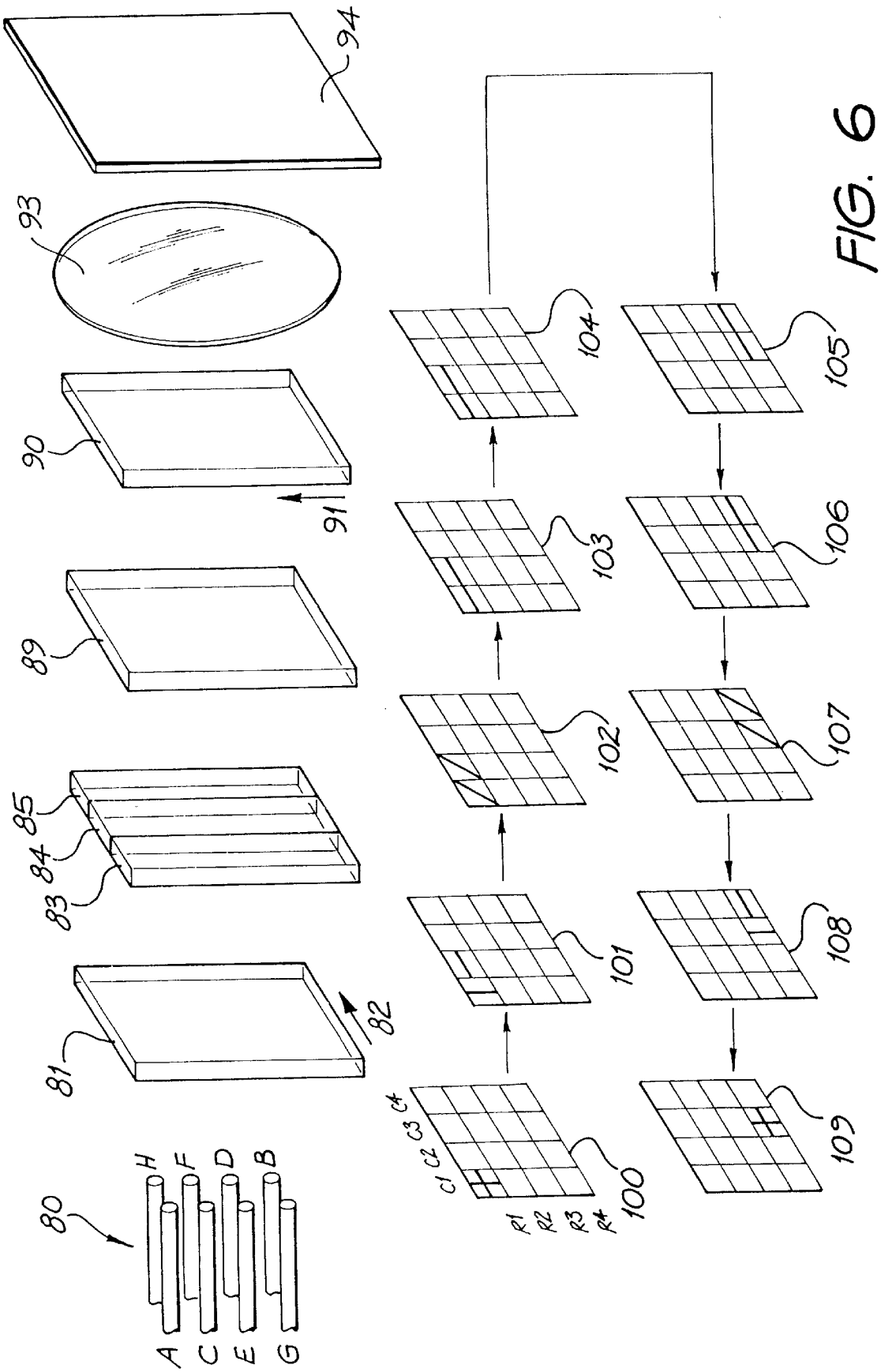
FIG. 6 to FIG. 9 illustrate polarization transition diagrams for the arrangement of FIG. 5.

Next, a Rutile crystal walkoff plate 90 is provided so as to allow for 63.5 micron displacement of the relevant polarisation state in the direction 91. Next, a gradient index lens 93 is provided such that proximate collimation of all the fibre images is achieved. This is followed by a reflective mirror surface 94 positioned at a distance behind the lens 93 such that parallel rays are returned substantially parallel. Turning to FIG. 6, there is illustrated a first example polarisation state diagram for the transition from the fibre A to the fibre B.

Starting initially with the polarisation state 100 emitted from the fibre A, after the transition through the walkoff plate 81, the polarisation state is as illustrated 101. The reciprocal rotators 83–85 results in an alignment of the polarisation states 102. Next, non-reciprocal rotation by the non-reciprocal rotator 89 results in the polarisation states 103. The rutile crystal 90, as a result of having its walkoff direction 91 has no effect on the polarisation state 104. The lens 93 and mirror 94 result in an inversion of the polarisation state 105. Again the polarization state is unaffected 106 by the walkoff plate 90. The non-reciprocal rotator 89 provides a rotation 107 in the polarisation state. The reciprocal-rotators 83–85 result in polarizations state 108. This is followed by translation by the walkoff plate 81 which results in an alignment of the polarisation state 109 which is output to the fibre B.

Figure 7:
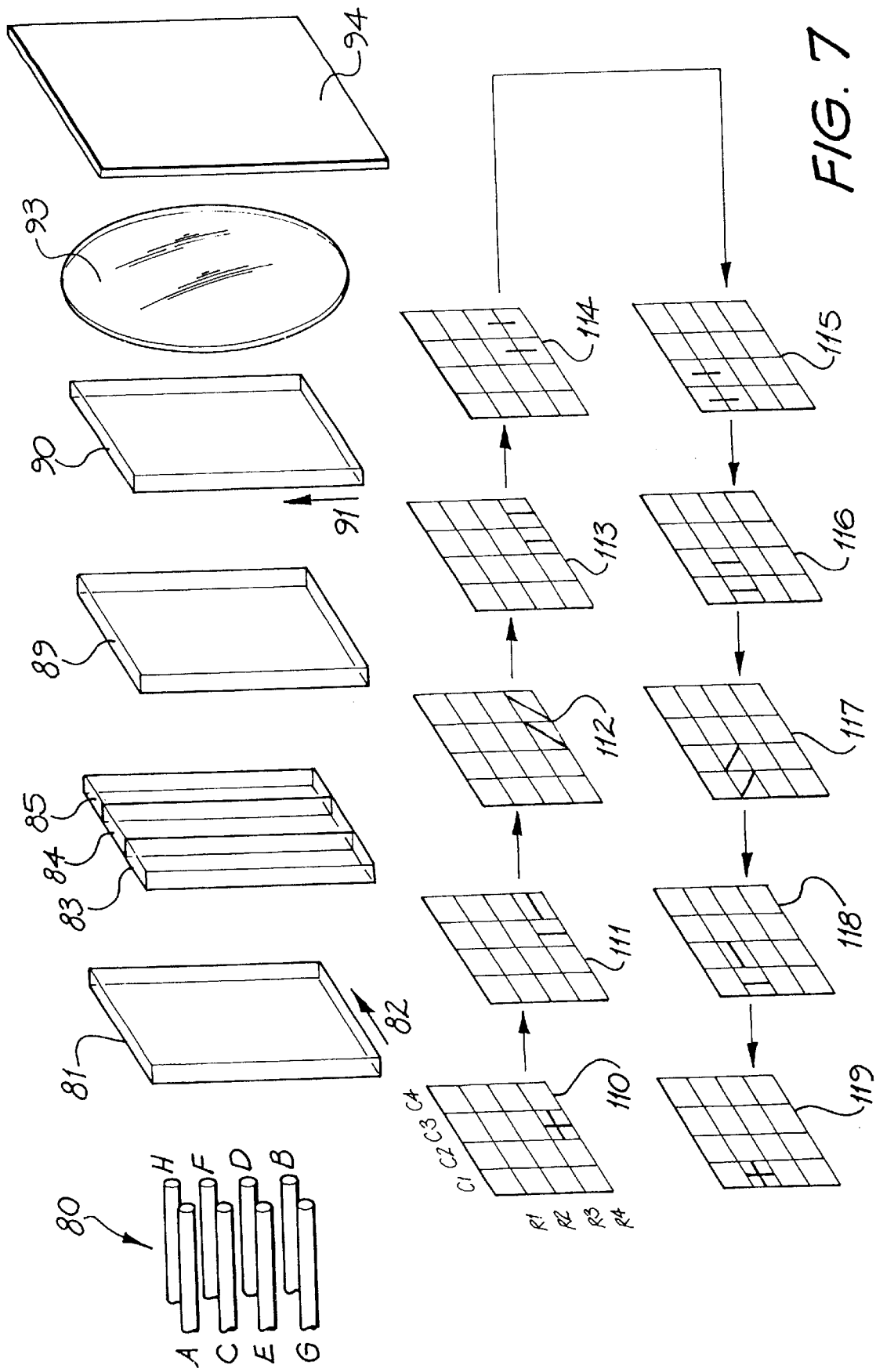

Turning now to FIG. 7, there is illustrated the corresponding series of polarisation states in going from fibre B to fibre C. Starting from the initial polarisation state 110, the walkoff plate 81 separates the polarisation states 111. The series of reciprocal rotators 83–85 result in an alignment 112 to the polarisation state. This is followed by the non-reciprocal rotator 89 rotating the polarisation states 113. The walkoff plate 90 results in a translation in the direction 91 so as to produce polarisation state 114 which is translated to polarisation state 115 by the lens 93 and mirror 94. The walkoff plate 90 in turn results in the polarisation state 116 which is rotated to 117 in a non-reciprocal manner by the Faraday rotator 89. The reciprocal rotators 83–85 result in the polarisation state 118 which in turn results in an alignment 119 of the polarisation state which is output to the fibre C.

Figure 8:
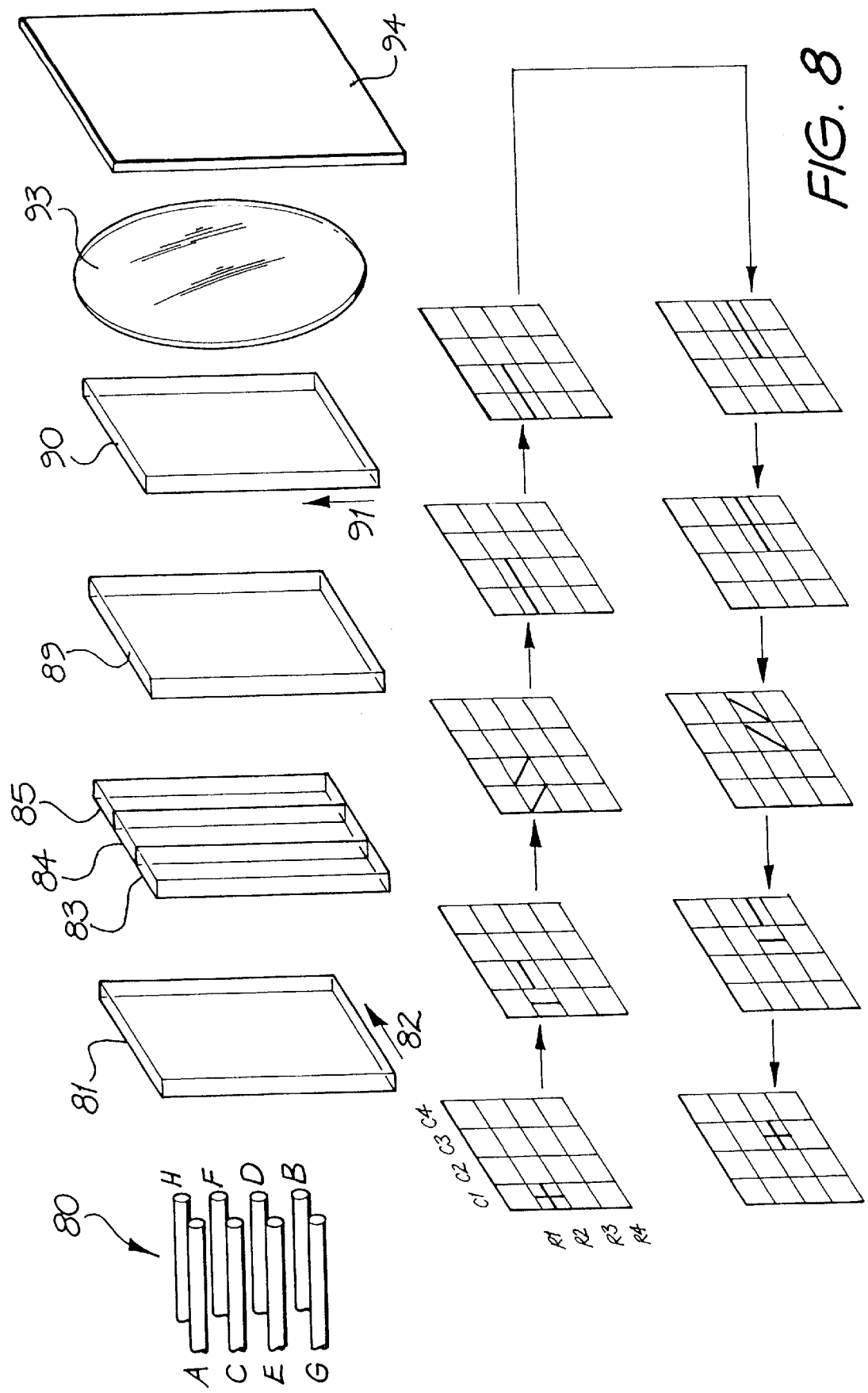
Figure 9:
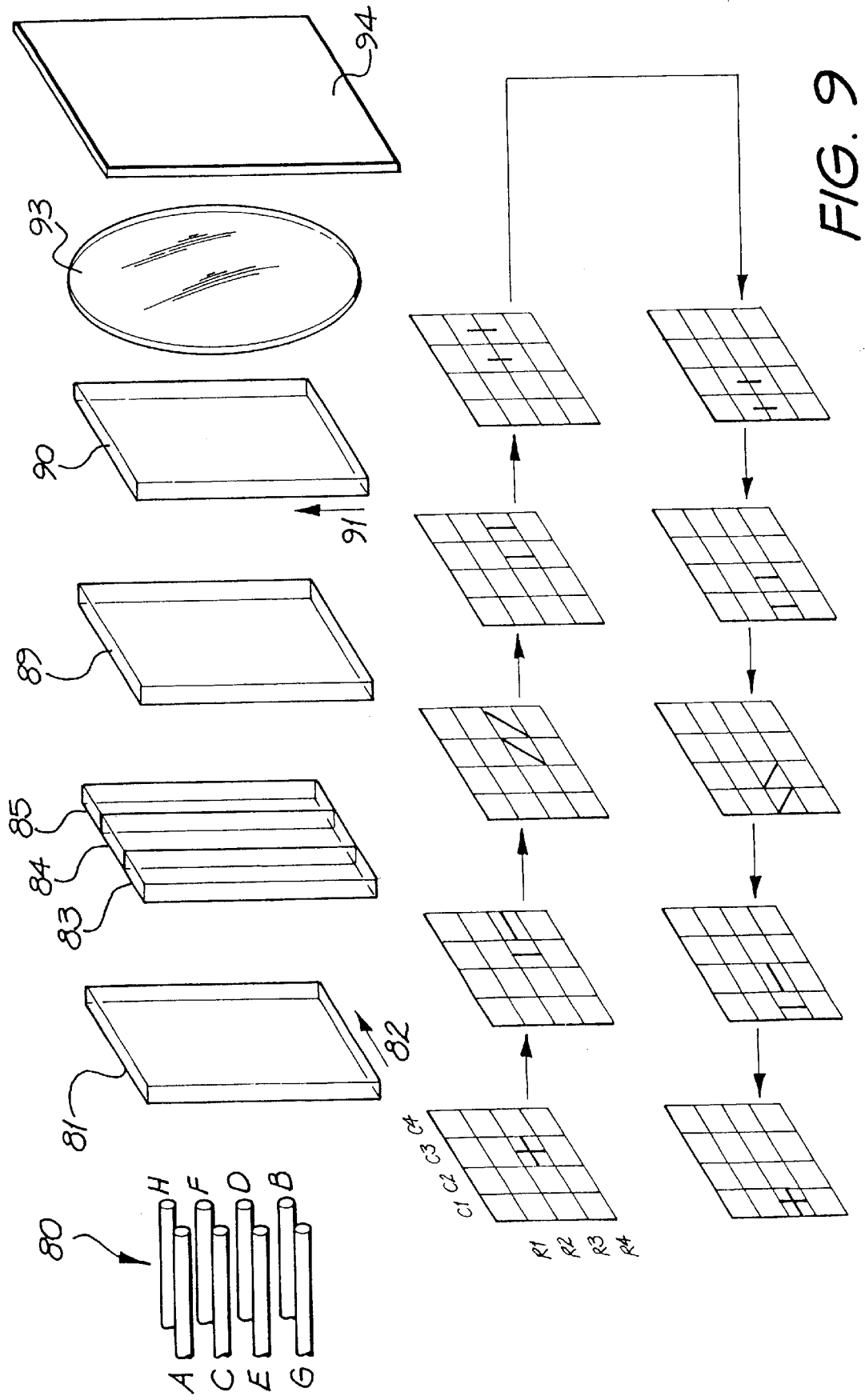

For completeness, FIG. 8 illustrates the corresponding polarisation transition diagrams for the transmission of light from fibre C to fibre D. FIG. 9 further illustrates the polarisation transition diagram for light going from the fibre D to the fibre E.

Figure 10:
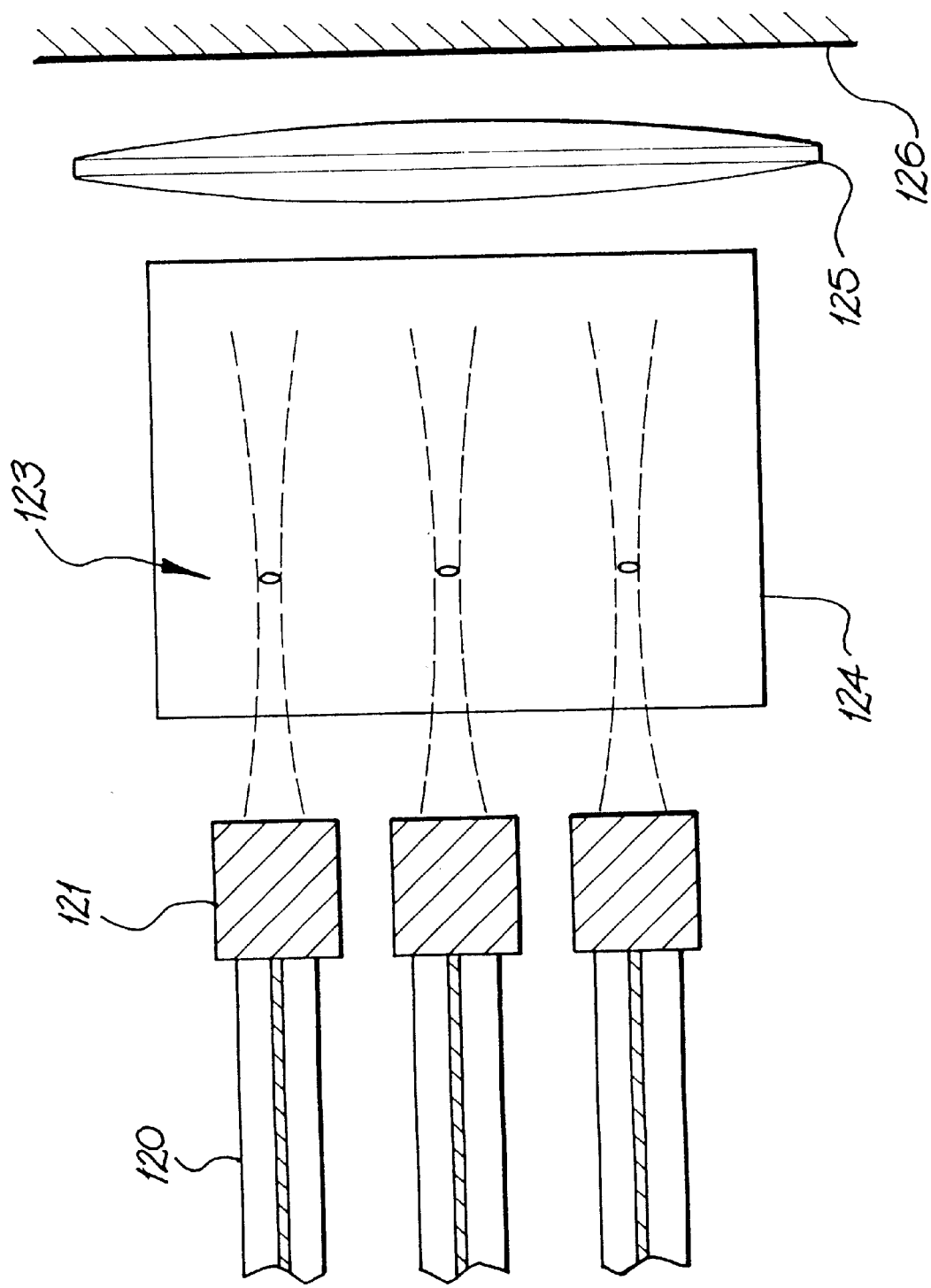
FIG. 10 and FIG. 11 illustrate modified forms of the present invention.

Whilst it will be evident to those skilled in the art that a number of modifications to the disclosed embodiments can be made whilst still utilising the core of the present invention, a number of such modifications will now be discussed. Firstly, the mode expansion can be implemented utilising different techniques. For example, as shown in FIG. 10, graded index fibre imaging can be utilised. In this modification to the arrangement of FIG. 1, the single mode fibre e.g. 120 includes a gradient index (GRIN) fibre 121 which projects a mode enlarged image e.g. 123 part way along the circulator elements which are indicated generally 124. The image 123 is further again imaged by lens 125 and mirror 126.

Figure 11:
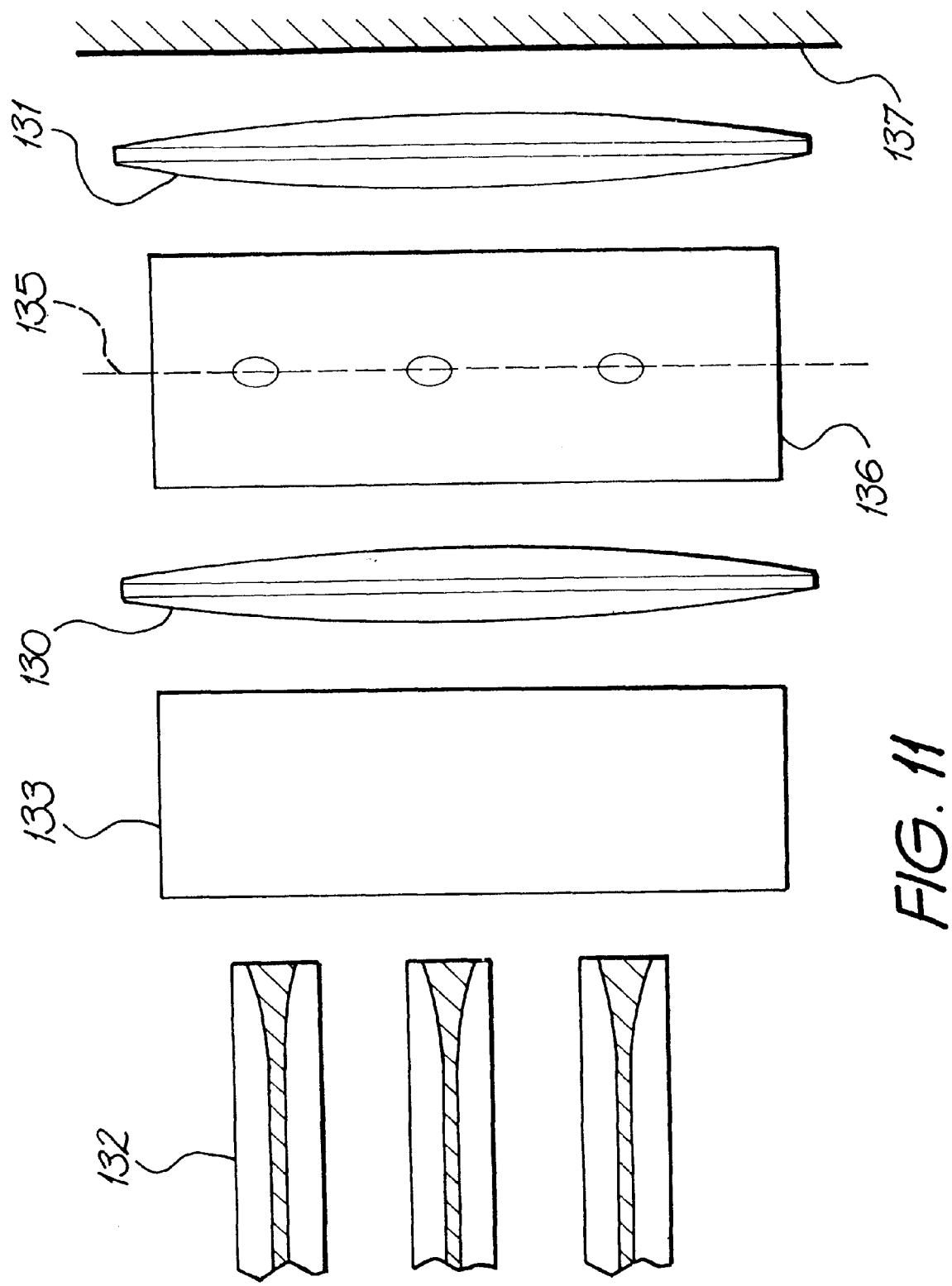

Also, the lensing arrangements can be altered in accordance with requirements. For example, FIG. 11 illustrates a re-arrangement which includes two lenses 130, 131. The image from the thermally expanded core fibre e.g. 132 is projected through circulator elements 133 before being imaged by lens 130 along an image plane 135, which can be part way along further circulator elements. The lens 131 and mirror 137 also act to image and reflect the polarisation components as previously discussed.

From the foregoing discussion, it can be seen that the embodiments include a number of significant advantages. These include polarisation independence of operation and good isolation of return paths. Good separation of polarization states is provided by means of mode expansion or offsetting of the mode expanded image such that light is most strongly confined in the region where the polarisation states can to be acted upon separately.

Figure 12:
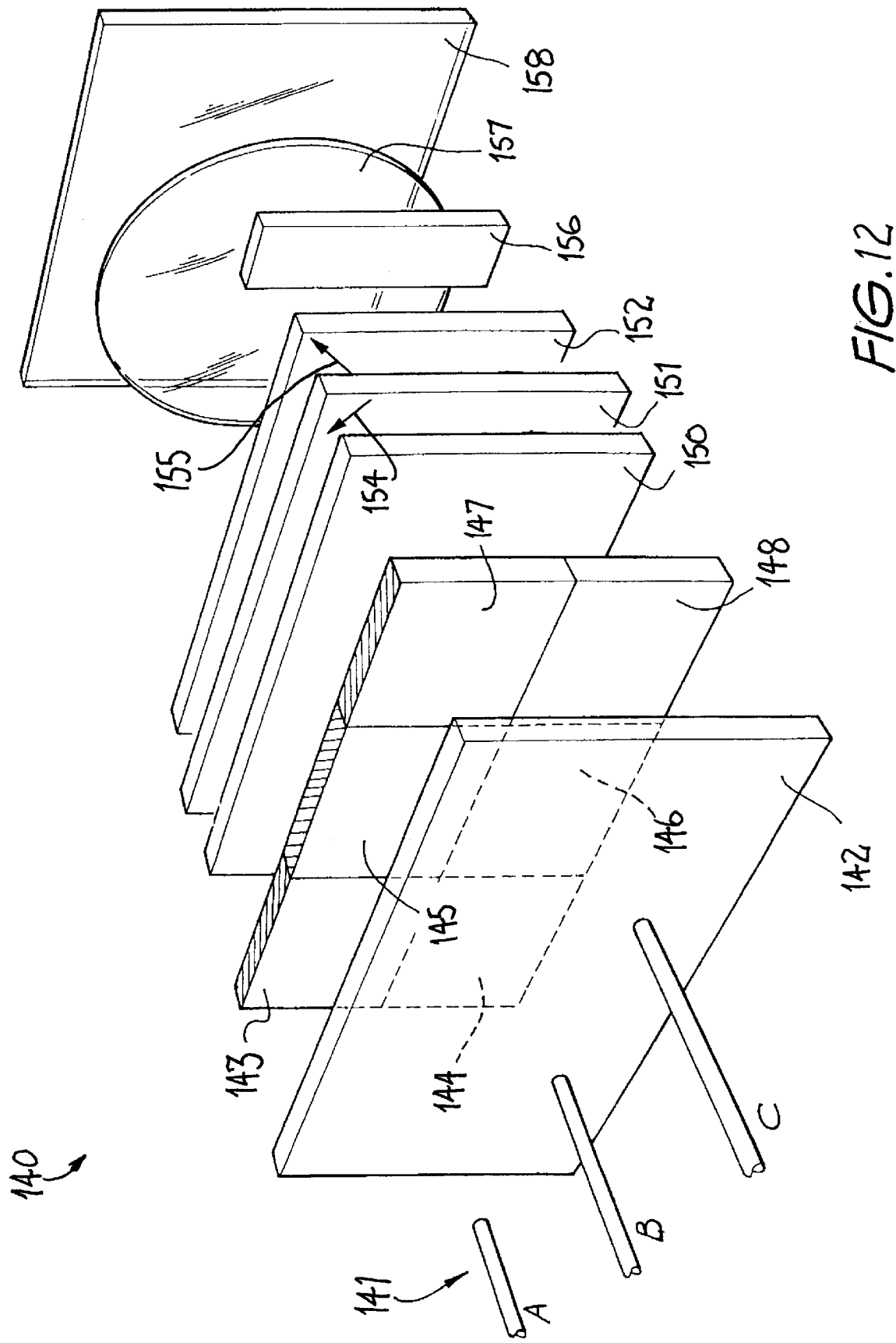
FIG. 12 illustrates schematically in perspective the arrangement of a further alternative embodiment.

The arrangement of FIG. 1, whilst being simple to construct, suffers from a slight disadvantage in that the focal planes for each coupling of light from an input port to an output port may be different due to the walkoff crystals providing different optical path lengths. Turning to FIG. 12, there is illustrated schematically, an alternative embodiment which is free from the disadvantage of the arrangement of FIG. 1.

This preferred embodiment includes an initial array 141 of three single mode fibres (SMF) labelled A, B and C which are approximately 125 microns in diameter. Each fibre can include a short length of gradient index fiber attached to an end (not shown) or other forms of mode expansion as discussed earlier. The three fibres 2 can be arranged in corresponding V-grooves with approximately 127 microns spacing. The gradient indexed fibre is such that it projects an enlarged image of the SMF fibre mode at distances of approximately 500 microns in air and with a diameter of 30 microns. Such devices are commercially available from Highwave Optical Technologies.

The device proper consists of the following components:

1. A first walkoff crystal 142 is provided and can comprise a rutile crystal with a width of approximately 1 mm. The walkoff crystal 142 is positioned adjacent to the gradient indexed fibre and is of sufficient dimension to separate the polarisation states projected from the fibres.

2. Next, a series of reciprocal rotators 143, 146, 147 abutted with non-rotating glass portions 144, 145, 148 are provided to achieve polarisation state equalisation of the fibres.

3. Next, a Faraday rotator 150 is provided to rotate all polarisation states by 45°.

4. Next, a composite of two rutile plates 151, 152 is provided to allow displacement in a polarisation dependant manner in the directions indicated 154, 155.

5. Next, a half-wave plate 156 is provided to intercept only the light from the fibre C on the outgoing path.

6. Next, a lens 157 can be a gradient indexed lens of pitch such as approximate formation of the fibre images is achieved.

7. Finally, a reflective mirror surface 158 is positioned at a distance behind the lens 157 such that parallel rays are returned substantially parallel.

The arrangement of FIG. 12 is again useful in providing for a fully circulating circulator in that input light from the fibre port A is output at fibre port B, input light from the fibre port B is output at fibre port C and input from fibre port C is output at the fibre port A.

Figure 13:
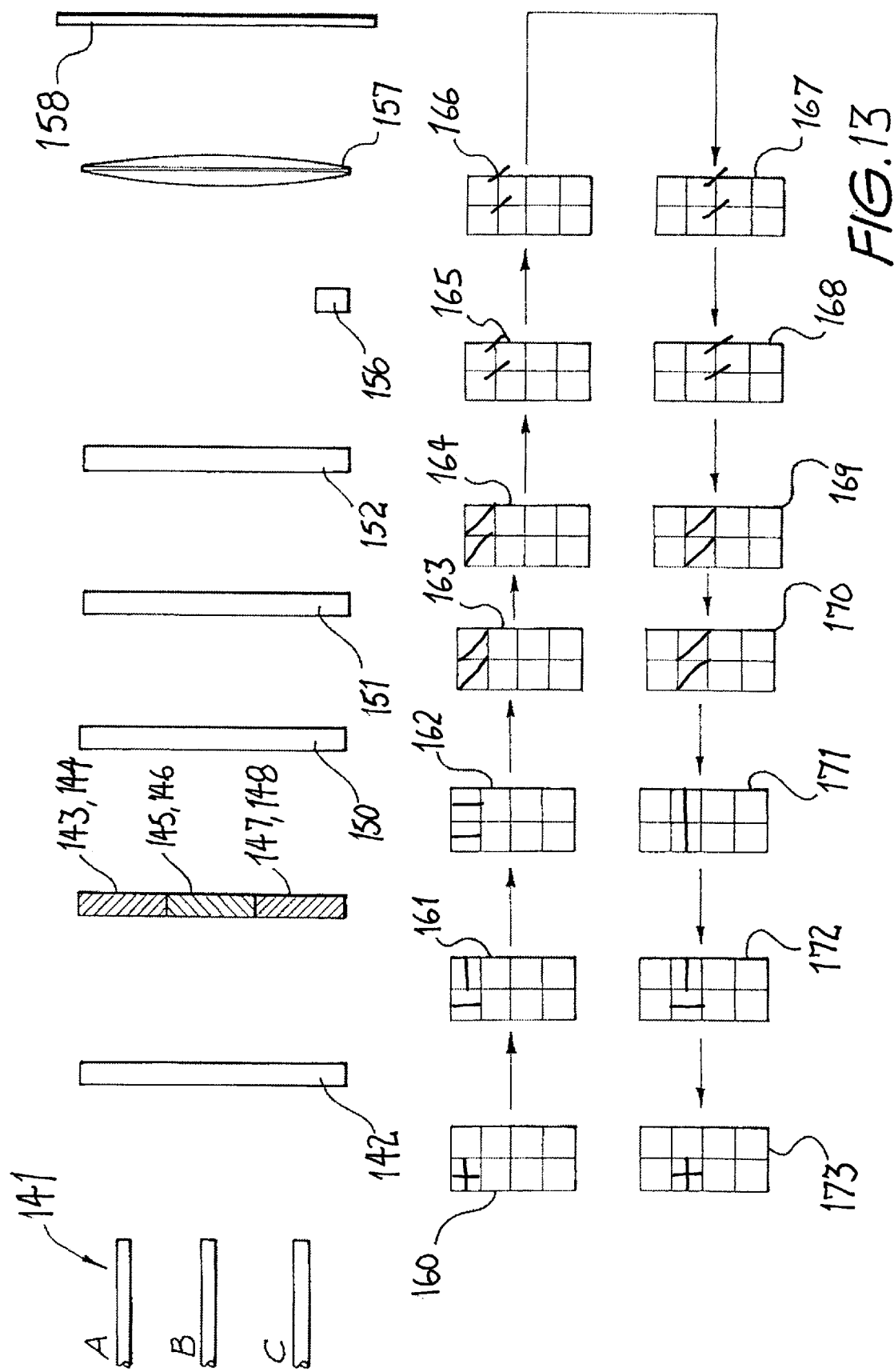
FIG. 13 illustrates a first polarization transition state diagram of light travelling from fibre A to fibre B for the arrangement of FIG. 12.

Turning now to FIG. 13, there is illustrated an initial polarisation transition diagram for light travelling from port A to port B. The two orthogonal polarisation states are initially spatially coincidental and are indicated by the initial cross 160. Subsequently, after traversing walkoff plate 142, the polarisation states are separated 161. The reciprocal rotator 143 results in a reciprocal rotation of one of the polarisation states so as to cause the output polarisation states to be aligned 162 in vertical direction.

The non-reciprocal rotator 150 provides for a non-reciprocal rotation of the polarisation states, which results in the polarisation states 162. The rutile 151 of the composite has its walkoff axis set so it will have no effect 164 on the two polarisation states in this case, while the rutile 152 results in a translation 165 of the two polarisation states in direction −45° to the horizontal, a distance with a horizontal component of about half the fibre's separation. The halfwave plate 156 is positioned so it will have no effect on the polarisation states in this case 166.

The effect of the lensing system 157 and mirror 158 is illustrated by the polarisation state diagram 167 and results in an inversion of the spatial states upon reflection from the mirror 158.

The halfwave plate 156 is positioned not to have an effect on the polarisation states and therefore results in polarisation state 168. The walkoff plate 152 reciprocally translates the polarisation states 169, while the walkoff plate 151 again does not have any effect. The Faraday rotator 150 is a non-reciprocal device and results in a non-reciprocal rotation of the polarisation states resulting in aligned polarisation states 171. The reciprocal rotator 146 is positioned to rotate one of the polarisation states by 90° in a reciprocal manner resulting in the polarisation states 172. The walkoff plate 142 then combines the polarisation states so as to produce output 173 having spatially combined polarisation states. Hence, the overall result is the transmission of output of fibre A to the fibre port B.

Figure 14:
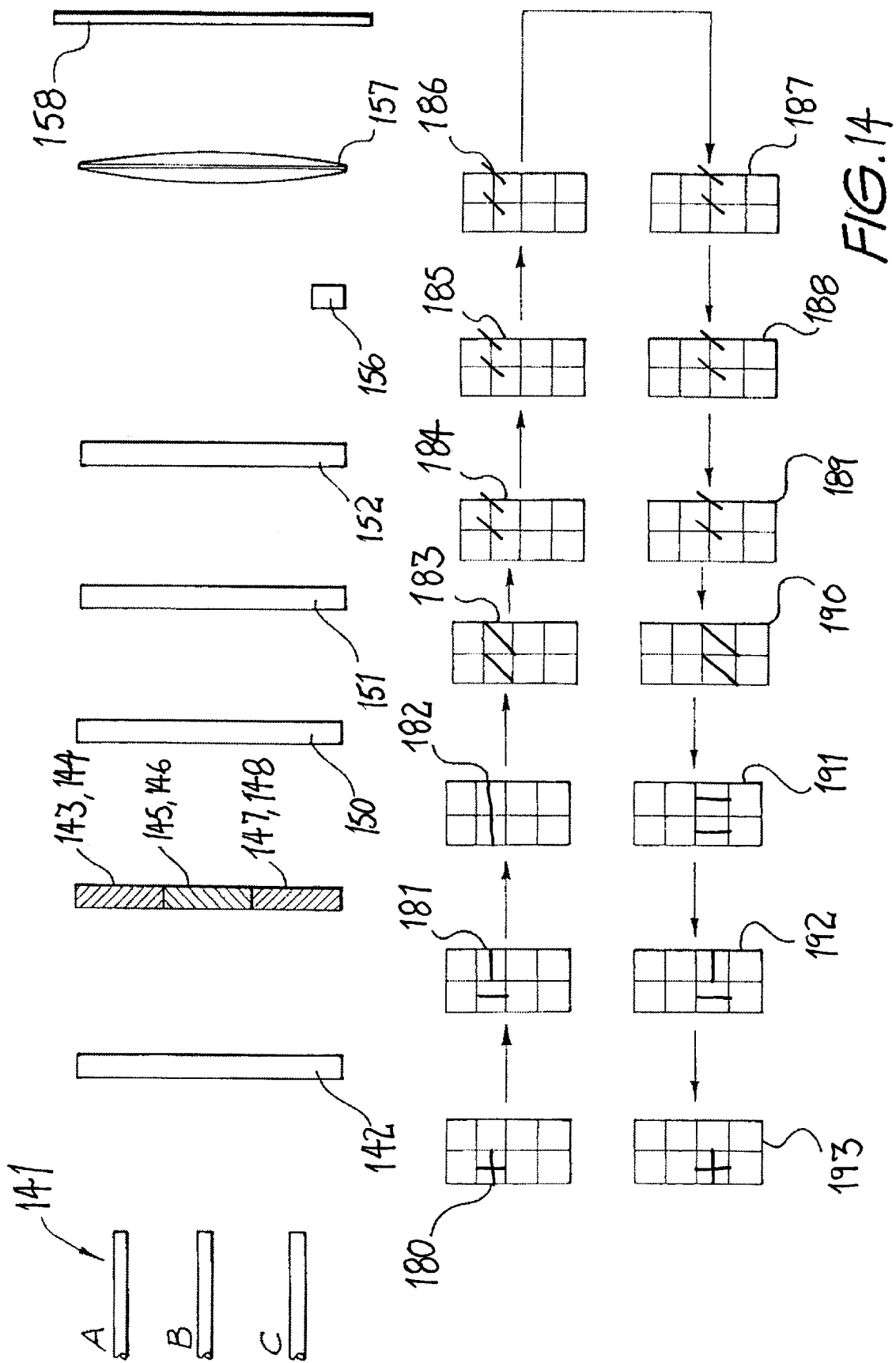
FIG. 14 illustrates a second polarization transition state diagram of light travelling from fibre B to fibre C for the arrangement of FIG. 12.

Turning now to FIG. 14, there is illustrated the polarisation state transition diagram for light emitted from the fibre port B to the fibre port C. In the initial polarisation state 180, both orthogonal polarisation states are spatially coincident. The walkoff plates 142 results in a translation 181 of one polarisation state with respect to the other. The reciprocal rotator 146 results in the alignment of the two polarisation states 182 in the horizontal direction. The faraday rotator 150 rotates the ploarization states 183. The rutile 150 translates the polarisation states 184 in direction 45° to the horizontal about halfway through the fibres separation. The rutile 152 has no effect, nor does the halfwave plate 156 which results in the polarisation state 186. The lens and mirror 157, 158 again result in an inversion of the polarisation states so as to produce the state 187. The halfwave plate 156 has no effect 188. The rutile 152 again has no effect, while the rutile 151 translates them in reciprocal manner producing polarisation states 190. The non-reciprocal Faraday rotator 150 rotates the polarisation states 191. The reciprocal rotator 147 rotates one of the polarization states, which produces the polarisation states 192. The walkoff plate 142 combines the polarisation states so as to produce output 193 having spatially combined polarisation states.

Figure 15:
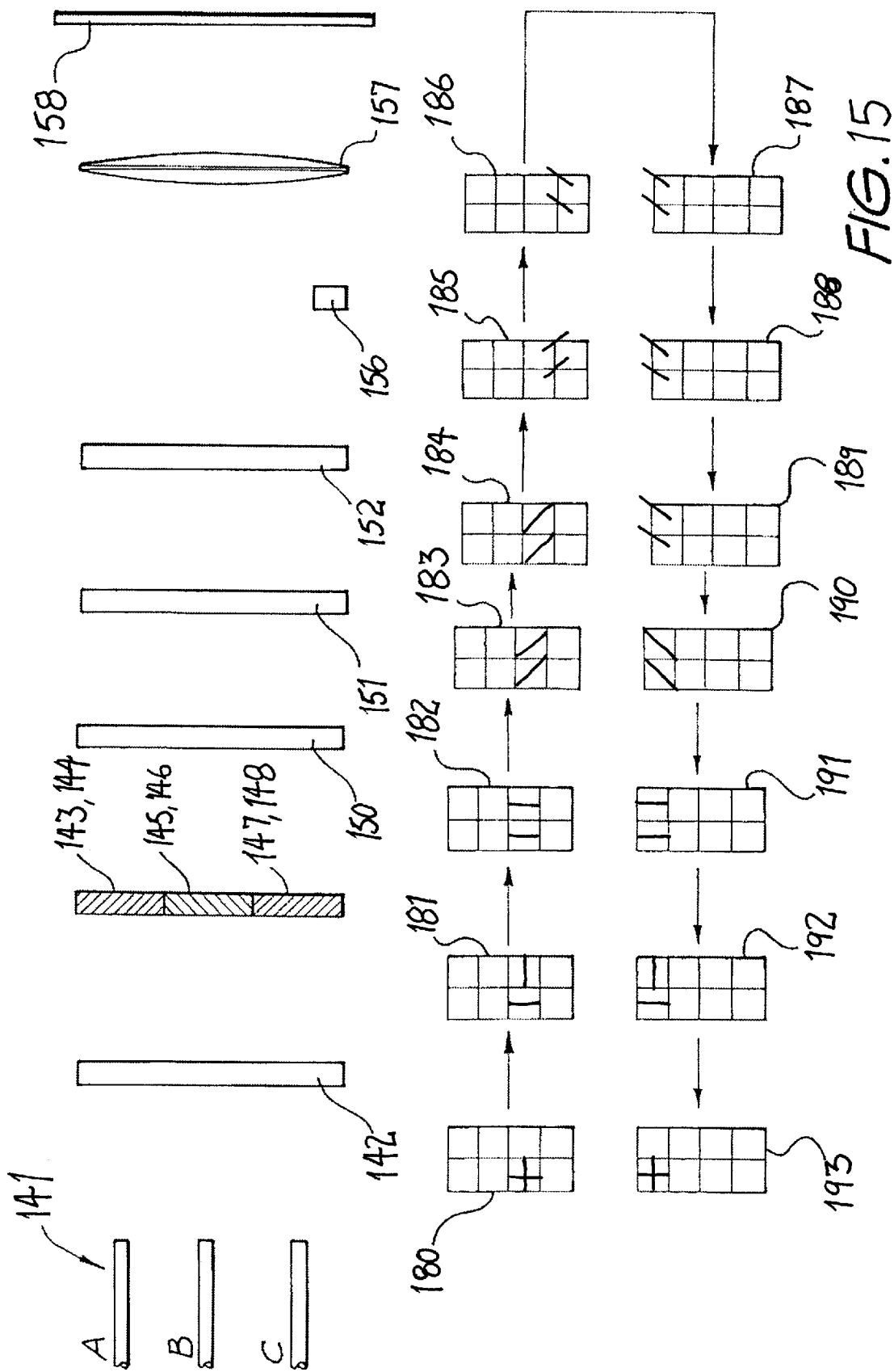
FIG. 15 illustrates a third polarization transition state diagram of light travelling from fibre C to fibre A for the arrangement of FIG. 12.

Turning now to FIG. 15, there is illustrated the polarisation state transition diagram for a fibre port C to fibre port A. Starting initially with the polarisation state 180, the walkoff plate 142 results in a splitting of the polarisation states 181. Subsequently, the reciprocal rotator 147 results in a reciprocal rotation of one of the polarisation states to bring them into alignment in vertical direction 182. The Faraday rotator 150 in turn rotates them to produce polarisation states 183. The rutile 151 of the composite has no effect on the two polarisation states in this case, while the rutile 152 results in a translation 185 of the two polarisation states in direction— 45° to the horizontal one about half of the fibres separation. The halfwave plate 156 in turn results in a rotation of the polarisation states producing polarisation states 186. Subsequently, after passing through lens 157 and being reflected by mirror 158, the polarisation states 187 are produced. The halfwave plate 156 has no effect 188 nor does the walkoff plate 152 which results in the polarisation states 189. The walkoff plate 151 reciprocally translates the polarisation states 190 in direction 45° to the horizontal one. The Faraday rotator 150 rotates the polarisation states 191 and the reciprocal rotator 147 further rotates one of the polarisation states to produce the polarisation state 192, which are combined by walkoff plate 142 to produce output 193, which is output to fibre A.

It can therefore be seen from the polarisation transition diagrams of FIG. 13 to FIG. 15 that the preferred embodiment operates as a fully circulating circulator.

Figure 16:
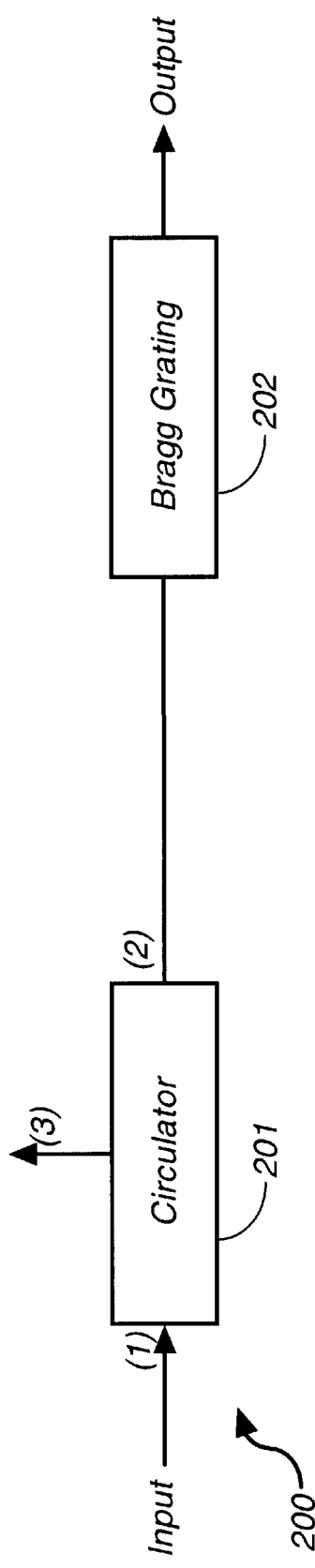
FIG. 16 illustrates a first use of the embodiments of the invention.

The embodiments have a number of uses in optical arrangements. For example, FIG. 16 shows an arrangement 200 including the use of a circulator 201 in conjunction with a bragg grating 202 to isolate a particular frequency. Input frequencies are transmitted by the ciculator from port 1 to 2. The desired output frequency is reflected by the bragg grating 202 and transmitted back to port 2 wherein it is outputted to port 3.

Figure 17:
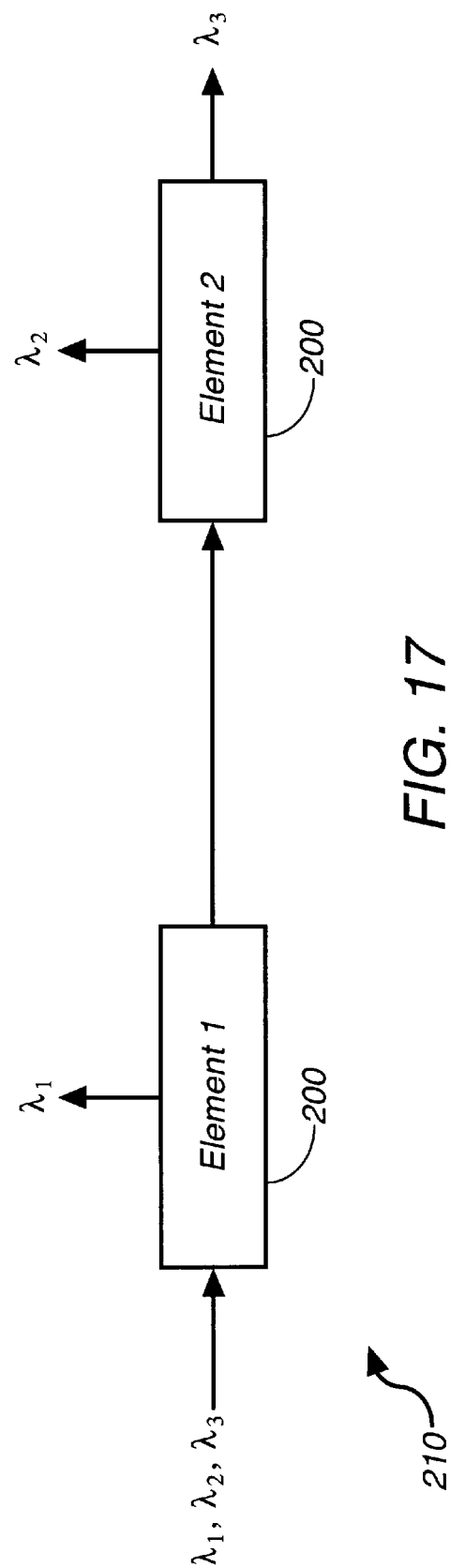
FIG. 17 illustrates a further use of the embodiments of the invention.

The arrangement of FIG. 16 can be extended to extracting multiple frequencies as shown in FIG. 17 wherein the elements 200 of FIG. 16 are cascaded together, each tuned to extract a particular frequency. In this manner, the circulator can be incorporated into a telecommunications system. It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A non-reciprocal optical device for mapping the outputs of a series of input/output signal waveguides to corresponding input/output signal waveguides in a non-reciprocal manner, said device comprising:

a series of spaced apart input/output waveguides;

a reflective imaging system for reflecting and focusing light emitted from said input/output waveguides;

a plurality of crystal elements between said input/output waveguides and said reflective imaging means;

at least one non-reciprocal polarization element;

wherein light emitted from each of a first series of input/output waveguides is simultaneously transmitted to a corresponding one of a second series of input/output waveguides and light emitted from each of said second series of input/output waveguides is simultaneously transmitted to a corresponding one of a third series of input/output waveguides, said transmissions being in a polarization independent manner, and wherein the focal lengths, of substantially orthogonal polarization states of light emitted from said input/output waveguides and reflected back to said input/output waveguides, are substantially the same.

2. A non-reciprocal optical device for mapping the outputs of a series of input/output signal waveguides to corresponding input/output signal waveguides in a non-reciprocal manner, said device comprising:

a series of spaced apart input/output waveguides;

a polarization separation means for spatially separating substantially orthogonal polarization states emitted from said input/output waveguides so as to produce separated polarization states;

polarization alignment means for aligning said separated polarization states to produce aligned polarization states;

a non-reciprocal rotator applying a non reciprocal rotation to said aligned polarization states to produce rotated polarization states;

at least two polarization dependent displacement plates providing a polarization dependent displacement of the rotated polarization states to produce displaced polarization states;

a half-wave plate providing a rotation of those displaced polarization states in a predetermined spatial position relative to said spaced apart input/output waveguides so as to produce rotated displaced polarization states;

a lensing system and mirror for focusing and reflecting the displaced polarization states and rotated displaced polarization states back through the polarization dependent displacement plates, non reciprocal rotator, polarization alignment means, polarization separation means and towards said spaced apart input/output waveguides; and wherein light emitted from each of a first series of input/output waveguides is simultaneously transmitted to a corresponding one of a second series of input/output waveguides and light emitted from each of said second series of input/output waveguides is simultaneously transmitted to a corresponding one of a third series of input/output waveguides, said transmissions being in a polarization independent manner.

3. A device as claimed in claim 2, wherein each of said polarization dependent displacement plates has a displacement axis along which displacement occurs and wherein two of said polarization dependent displacement plates have substantially orthogonal displacement axes.

4. A device as claimed in claim 2, wherein light emitted from said third series is transmitted to said first series of input/output waveguides.

5. An add or drop multiplexer including a device as claimed in claim 2.

6. An optical communications system for transmitting a series of signals from a first location to a second location, said system including at least one device as claimed in claim 2.

7. A device as claimed in claim 2, wherein each of said input/output waveguides comprise optical fibers having expanded core fiber ends.

* * * * *